(12) United States Patent
Dubey et al.

(10) Patent No.: US 10,576,881 B2
(45) Date of Patent: Mar. 3, 2020

(54) AUTONOMOUS VEHICLE B-PILLAR PROXIMITY WARNING SYSTEM

(71) Applicant: Ford Global Technologies, LLC, Dearborn, MI (US)

(72) Inventors: Prashant Dubey, Canton, MI (US); LaRon Michelle Brown, Detroit, MI (US); Segundo Baldovino, Novi, MI (US); Venkatesh Krishnan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/911,952

(22) Filed: Mar. 5, 2018

(65) Prior Publication Data

US 2019/0270406 A1 Sep. 5, 2019

(51) Int. Cl.
*B60Q 1/52* (2006.01)
*B60Q 1/00* (2006.01)
*B60Q 1/26* (2006.01)
*G08G 1/16* (2006.01)
*B60Q 1/32* (2006.01)

(52) U.S. Cl.
CPC ........... *B60Q 1/525* (2013.01); *B60Q 1/0023* (2013.01); *B60Q 1/2607* (2013.01); *B60Q 1/2696* (2013.01); *B60Q 1/32* (2013.01); *G08G 1/166* (2013.01)

(58) Field of Classification Search
CPC ................................. B60W 10/00; G08G 1/00
See application file for complete search history.

(56) References Cited

U.S. PATENT DOCUMENTS

| | | | |
|---|---|---|---|
| 6,619,824 B1 * | 9/2003 | Hou | B60Q 1/2615 362/501 |
| 7,365,641 B2 | 4/2008 | Nou | |
| 9,787,951 B2 | 10/2017 | Kannon et al. | |
| 2007/0229238 A1 * | 10/2007 | Boyles | G06K 9/00369 340/435 |
| 2008/0258898 A1 * | 10/2008 | Yang | B60Q 1/444 340/468 |
| 2017/0178512 A1 * | 6/2017 | Kannon | B60R 1/00 |
| 2017/0248953 A1 | 8/2017 | Kelley et al. | |
| 2017/0249844 A1 | 8/2017 | Perkins et al. | |
| 2017/0297565 A1 | 10/2017 | Joyce et al. | |
| 2017/0320495 A1 | 11/2017 | Lu et al. | |
| 2017/0364072 A1 | 12/2017 | Yako et al. | |
| 2018/0082588 A1 * | 3/2018 | Hoffman, Jr. | G08G 1/166 |
| 2018/0136654 A1 * | 5/2018 | Kentley-Klay | G05D 1/0088 |

FOREIGN PATENT DOCUMENTS

| | | |
|---|---|---|
| ES | 1134808 U | 12/2014 |
| JP | 2014146177 A | 8/2014 |
| KR | 20140010804 A | 1/2014 |

* cited by examiner

*Primary Examiner* — Shirley Lu
(74) *Attorney, Agent, or Firm* — David Coppiellie; Price Heneveld LLP (57) ABSTRACT

A B-pillar vehicle warning system includes a plurality of regions that can be illuminated to provide green, yellow, and red light. The warning system may be configured to utilize inputs from an autonomous driving sensing system to determine a location of a pedestrian, cyclist, vehicle, etc. relative to the vehicle. The system may be configured to illuminate specific lights in a predefined sequence based on a position of a pedestrian to alert/warn a pedestrian approaching the vehicle.

7 Claims, 8 Drawing Sheets

AUTONOMOUS VEHICLE B-PILLAR PROXIMITY WARNING SYSTEM

FIELD OF THE INVENTION

The present invention generally relates to object detection and warning systems for motor vehicles.

BACKGROUND OF THE INVENTION

Autonomous vehicles assume certain vehicle tasks otherwise handled by a traditional vehicle driver. Autonomous vehicles can navigate to a specific destination by controlling the steering, acceleration, braking, etc. relying on sensors or other resources to detect nearby vehicles, pedestrians, and objects in or near the road. The autonomous vehicle is controlled according to the signals output by these sensors.

Conventional (non-autonomous) vehicles may include sensor systems to detect objects (e.g. other vehicles) for use in connection with parking assist systems and the like.

SUMMARY OF THE INVENTION

One aspect of the present invention is an autonomous vehicle including a body structure and front and rear doors on opposite sides of the vehicle. The vehicle includes upwardly-extending B-pillars disposed between upper portions of the front and rear doors. The autonomous vehicle further includes an autonomous driving sensing system configured to detect pedestrians and the locations of pedestrians relative to the body structure, whereby a distance from the opposite sides to pedestrians can be determined. At least one of the B-pillars includes a warning light system. The warning light system includes light sources (e.g. LEDs) that are configured to emit green light if an object (e.g. a pedestrian) is detected at a first distance or a distance greater than the first distance. The warning light system is also configured to emit yellow light if an object is detected at an intermediate distance that is between the first distance and a second distance that is less than the first distance. The warning light system is further configured to emit red light if an object is detected at a distance equal to or less than the second distance.

Another aspect of the present invention is an autonomous motor vehicle including a body and side doors with front and rear windows with B-pillars that extend upwardly between the front and rear windows. Each B-pillar includes a warning light system having a controller that utilizes data from an autonomous driving sensor of the vehicle to sequentially illuminate green, yellow, and red bands. The bands comprise a vertical row of LEDs that are aligned with the passageways through a spacer that is covered by a light-transmitting sheet. The bands illuminate sequentially as a pedestrian approaches the vehicle. The light sequence may include green light only, followed by green and yellow light, followed by yellow light only, followed by yellow and red light, followed by red light only. Alternatively, the light sequence may comprise green only, followed by yellow only, followed by red only.

Another aspect of the present invention is a pedestrian warning system for motor vehicles including a sensor system that is capable of detecting a location of pedestrians adjacent opposite sides of a vehicle. The warning system further includes a B-pillar warning light system including a vertical row of light sources arranged to be positioned on a B-pillar of a motor vehicle. The light sources can be actuated to provide green, yellow, and red illuminated areas on an outer side of the warning system. The warning system further includes a controller that is configured to actuate only selected ones of the light sources based, at least in part, on a location of a pedestrian relative to a side of a vehicle according to predefined criteria.

Embodiments of the invention may include any one or a combination of the following features:

A controller and a row of RGB LEDs mounted on a printed circuit board (PCB).
The controller may be operably connected to a main vehicle autonomous control and sensor system.
A diffuser/spacer having passageways (openings) aligned with the LEDs. The spacer may optionally comprise a resilient material that absorbs impact forces.
A molded applique having openings or light-transmitting regions aligned with the LEDs and/or passageways of the diffuser/spacer.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
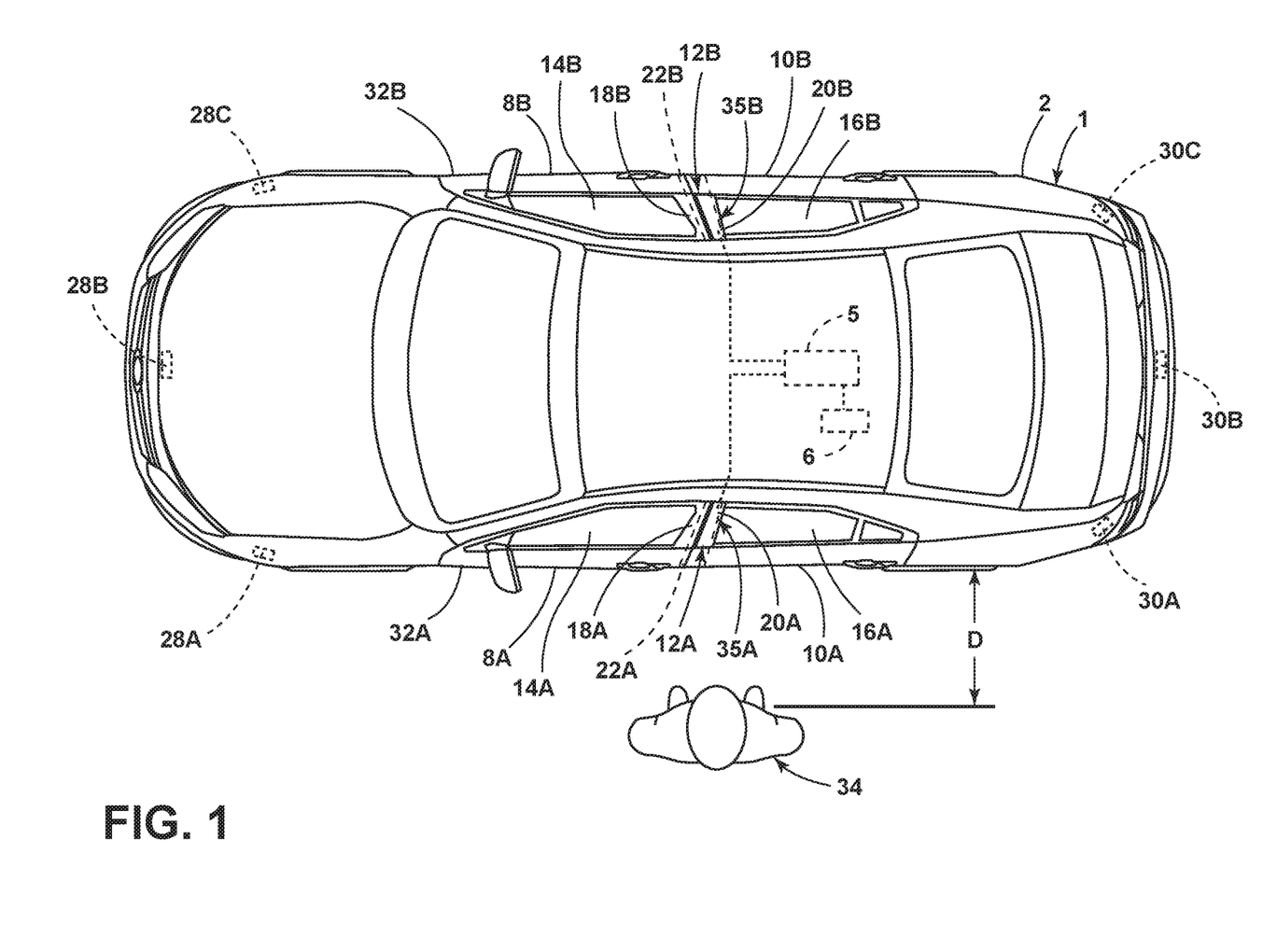
FIG. 1 is a partially schematic top plan view of a motor vehicle including a B-pillar warning light system according to one aspect of the present invention.
Figure 2:
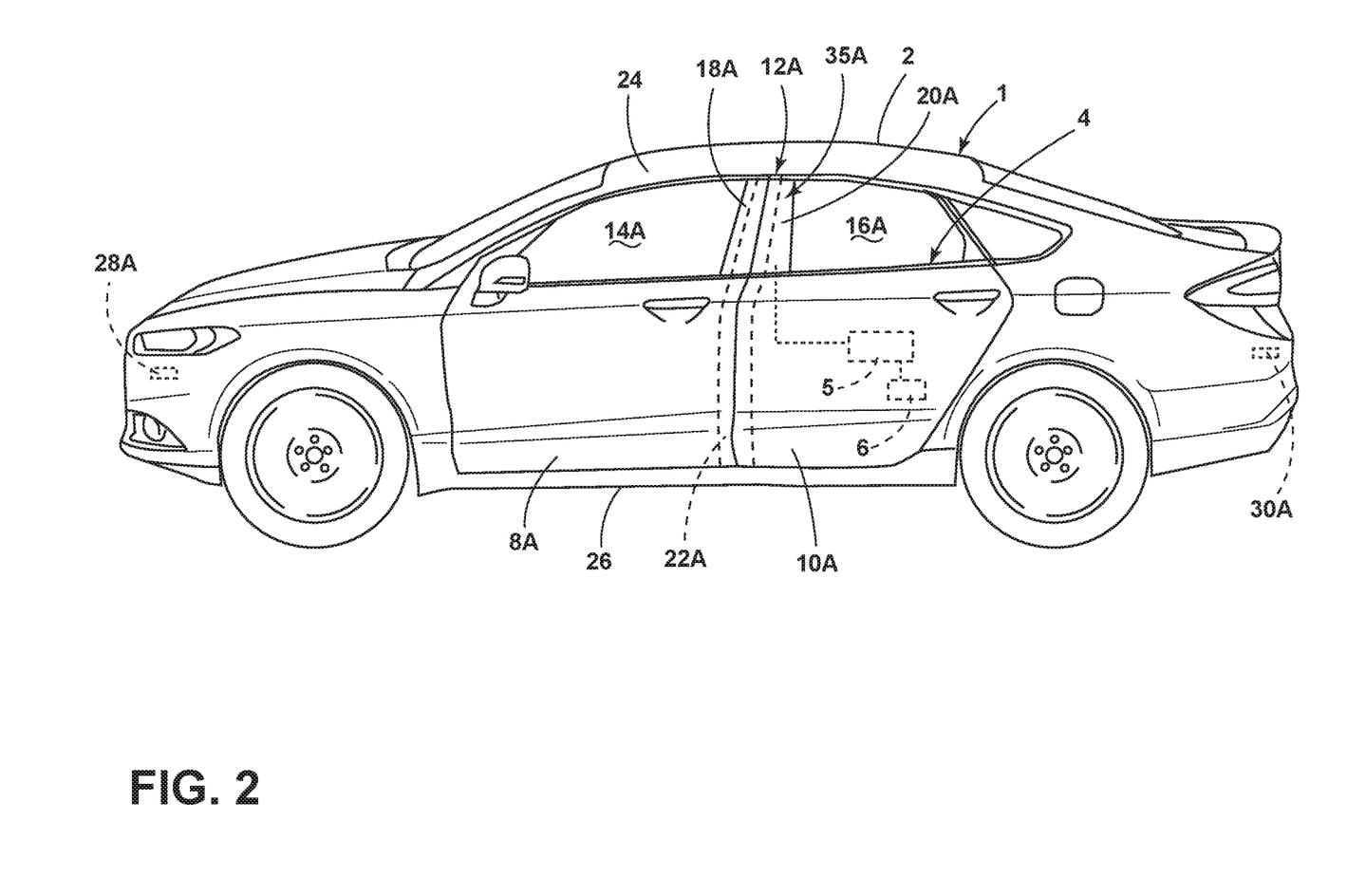
FIG. 2 is a side plan view of the motor vehicle of FIG. 1.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIGS. 1 and 2, a motor vehicle 1 includes a body structure 2 having front doors 8A and 8B, and rear doors 10A and 10B that are movably mounted to the body structure 2 in a conventional manner that is well known to those skilled in the art. The doors and body structure define B-pillars 12A and 12B that extend vertically between front windows 14A, 14B and rear windows 16A, 16B, respectively. B-pillars 12A and 12B may include a vertical structural element 18A of front door 8A that extends upwardly along a rear portion of window 14A, a vertical door structure 20A extending vertically along a forward portion of rear door window 16A, and an internal body structure 22A that extends between and interconnects roof structure 24 and floor structure 26 of vehicle body structure 2. In the illustrated example, the vertical B-pillar body structure 22A is hidden behind the vertical door structures (e.g. 18A and 20A). However, it will be understood that vehicle 1 may include B-pillar body structure 22 that is exposed rather than being covered by the door structure.

Referring again to FIGS. 1 and 2, vehicle 1 may include a main control system 5 that is operably connected to an electric power system 6. The vehicle control system 5 may comprise an autonomous vehicle control system that is operably connected to a plurality of autonomous driving sensors such as front sensors 28A, 28B, and 28C, and rear sensors 30A, 30B, and 30C. The sensors 28A-28C and 30A-30C may comprise ultrasonic radar sensing units that are capable of detecting a pedestrian 34, a bicyclist (not shown), or other object adjacent sides 32A and 32B of vehicle 1. The sensing system may include a LIDAR system, one or more cameras, and/or other sensors that enable the control system 5 to determine locations (e.g. distance "D", FIG. 1) of objects (e.g. pedestrian 34) relative to the B-pillars 12A and 12B of vehicle 1. Examples of autonomous vehicle sensing and control systems may be found in U.S. Pat. Nos. 9,981,657 and 10,037,033, the entire contents of each of which are incorporated by reference. The autonomous sensing system may be configured to provide data input to main controller 5 to permit autonomous operation of vehicle 1. The main control system 5 may include a GPS system that may be utilized to further refine/calculate the location of the vehicle 1 and the location of a pedestrian 34 or other object relative to vehicle 1.

The control system 5 may utilize inputs from an autonomous driving sensing system to provide for operation of vehicle 1 without requiring a conventional (human) driver. However, the present invention is not limited to autonomous vehicles, and vehicle 1 may comprise a conventional motor vehicle that is operated by a human, and the sensing system (e.g. sensors 28A-28C and 30A-30C) may comprise sensors utilized for assisted or automated vehicle parking, a lane change alert system, or other such systems. Also, it will be understood that the control system 5 (whether convention or autonomous) may include numerous individual components such as a main vehicle control computer, a navigation computer, a braking control computer, a propulsion control computer, a biometric monitor computer, a steering controls computer, and a telematics unit.

Referring again to FIGS. 1 and 2, motor vehicle 1 includes a right (driver's side) B-pillar warning system 35A at B-pillar 12A, and a left (passenger side) B-pillar warning system 35B at B-pillar 12B. The B-pillar warning systems 35A and 35B are operably connected to the control system 5, and provide illuminated/lighted warning and/or audio warnings to individuals such as a pedestrian 34 approaching vehicle 1. In the illustrated example, the B-pillar warning system 35A is mounted to vertical rear door structure 20A of rear door 10A, and the B-pillar warning system 35B is mounted to vertical door structure 20B of rear door 10B. Alternatively, the B-pillar warning systems 35A and 35B could be mounted to front door vertical structures 18A and 18B, respectively. Alternatively, the vehicle 1 may be configured to have an exposed vertical body structure 22A and 22B, and the B-pillar warning systems 35A and 35B may be mounted to the stationary body structures 22A and 22B at the B-pillar locations (i.e. between the windows of the front and rear doors). Accordingly, it will be understood that a B-pillar warning system according to the present invention may be mounted to various B-pillar structures whereby the B-pillar warning systems 35A and 35B extend vertically between a vehicle belt line 4 and the vehicle roof 24 between the windows of the front and rear doors of vehicle 1. It will be understood that the B-pillar warning system of the present invention is not limited to a specific vehicle body type, and the B-pillar warning system could comprise virtually any type of visual display extending between a belt line 4 and roof 24 (or floor structure) of a vehicle.

Figure 3:
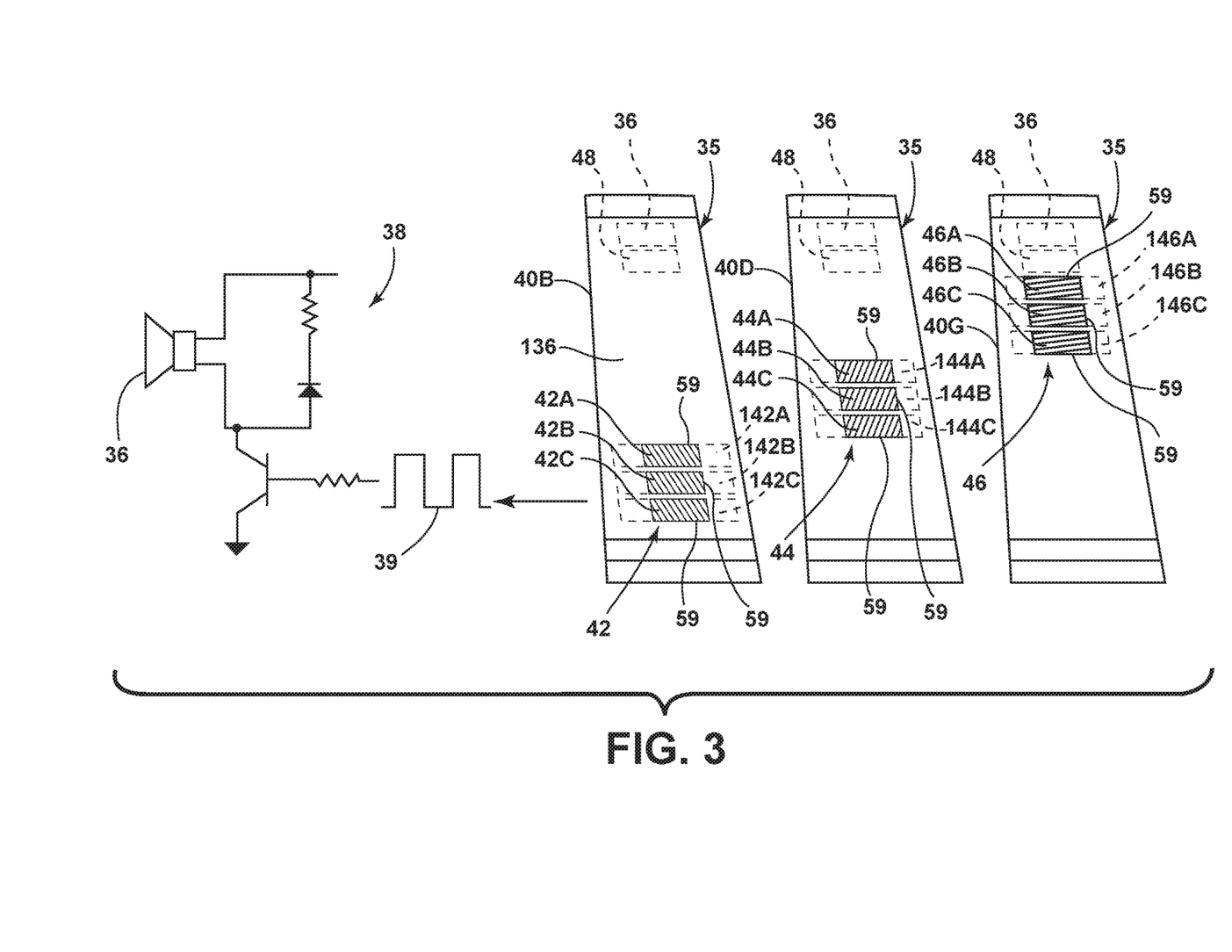
FIG. 3 is a schematic view of a warning light system according to one aspect of the present invention.
Figure 4:
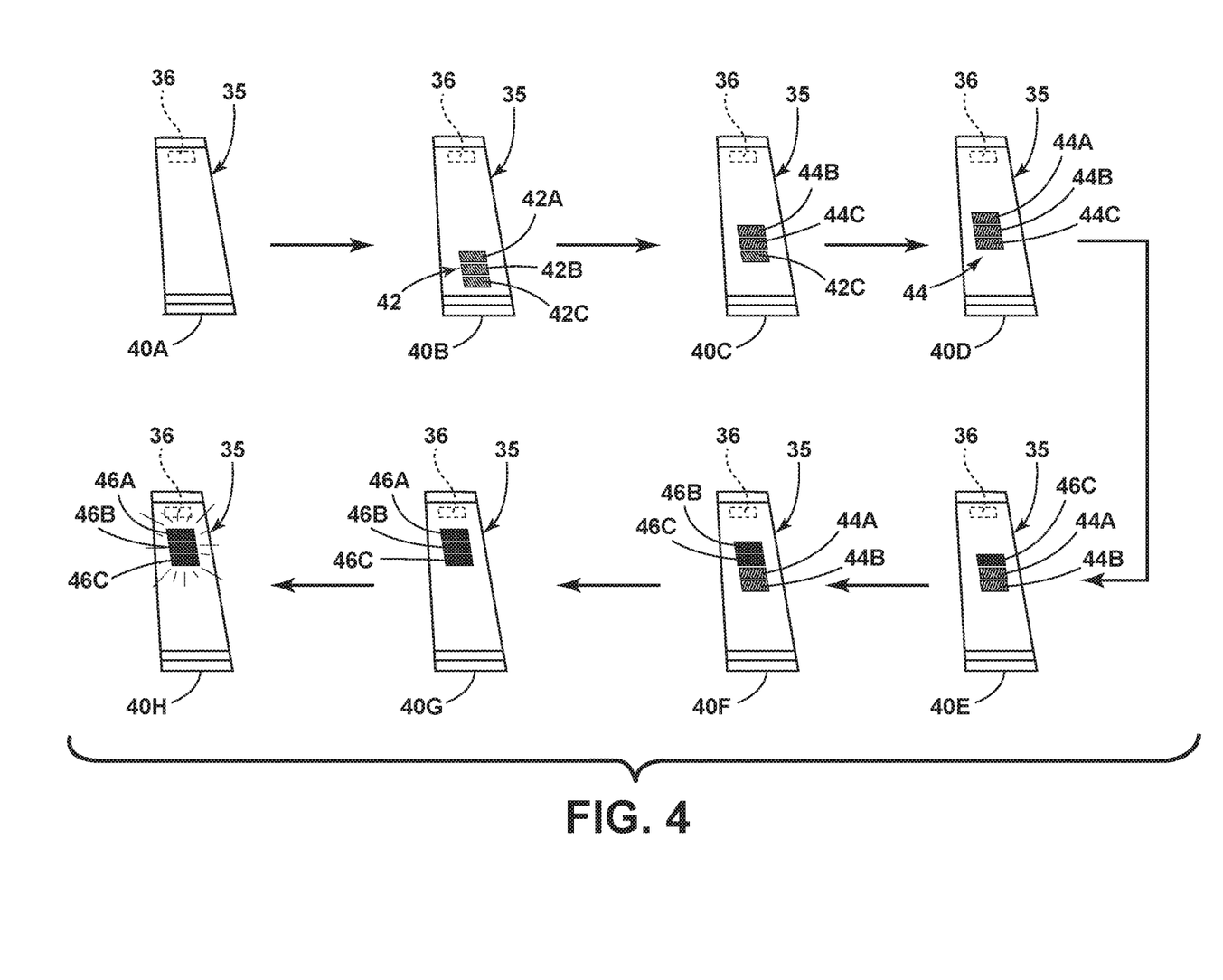
FIG. 4 is a partially schematic view showing operation (sequential illumination) of the B-pillar warning light system.

Operation of an exemplary B-pillar warning system 35 is shown schematically in FIGS. 3 and 4. It will be understood that B-pillar warning systems 35A and 35B may operate in substantially the same manner as the exemplary B-pillar warning system 35. FIG. 3 shows operation in green only, yellow only, and red only warning states 40B, 40D, and 40G, respectively. As discussed in more detail below, FIG. 4 shows operation in warning states 40B-40H, which include combinations of colors.

If a pedestrian 34 is not detected in the vicinity of vehicle 1, the warning system 35 is in an initial state designated 40A (FIG. 4) in which no light or audio signal is emitted. As a pedestrian 34 approaches vehicle 1, the B-pillar warning system 35 transitions through a series of illumination/audio warning states 40B-40H to increase the warning signal provided to a pedestrian 34. It will be understood that the operation of a B-pillar warning system according to the present invention is not limited to a pedestrian, and may operate in substantially the same manner if, for example, a bicyclist or other object is detected in the vicinity of vehicle 1.

Referring to FIG. 3, if a pedestrian 34 or other object is initially detected at a distance "D" of almost 6 feet, a green warning light 42 comprising three green illuminated areas 42A, 42B, and 42C is actuated/illuminated to alert the pedestrian 34 that he/she is approaching the vehicle 1 and/or that the vehicle 1 has detected the presence of the pedestrian. As a pedestrian 34 moves closer to the vehicle 1, at a distance of about three feet an illumination state 40D is activated. In illumination state 40D the green illuminated regions 42A-42C are turned off, and a yellow warning light 44 comprising three yellow regions 44A-44C are illuminated to alert/signal to a pedestrian that the pedestrian is relatively close to vehicle 1. If a pedestrian is detected at a distance D of about one foot or less, the B-pillar warning system 35 switches to an illumination/warning state 40G in which a red warning light 46 comprising three red regions 46A-46C are illuminated, without any of the green regions 42A-42C or yellow regions 44A-44C being illuminated. The red illuminated regions 46A-46C alert a pedestrian that they are very close to the vehicle 1. As discussed below in connection with FIG. 4, the B-pillar warning system 35 may optionally include an additional illumination/warning state 40H in which the red illuminated regions 46A-46C flash to further warn a pedestrian that he/she is too close to vehicle 1. The illuminated regions may comprise closely spaced bands or bars having a horizontal dimension that is significantly larger than a vertical dimension. In particular, the illuminated regions may extend across substantially the entire width of outer surface 136 of warning system 35 as shown by the dashed lines 142A-142C, 144A-144C, and 146A-146C. As discussed below in connection with FIGS.

Figure 5:
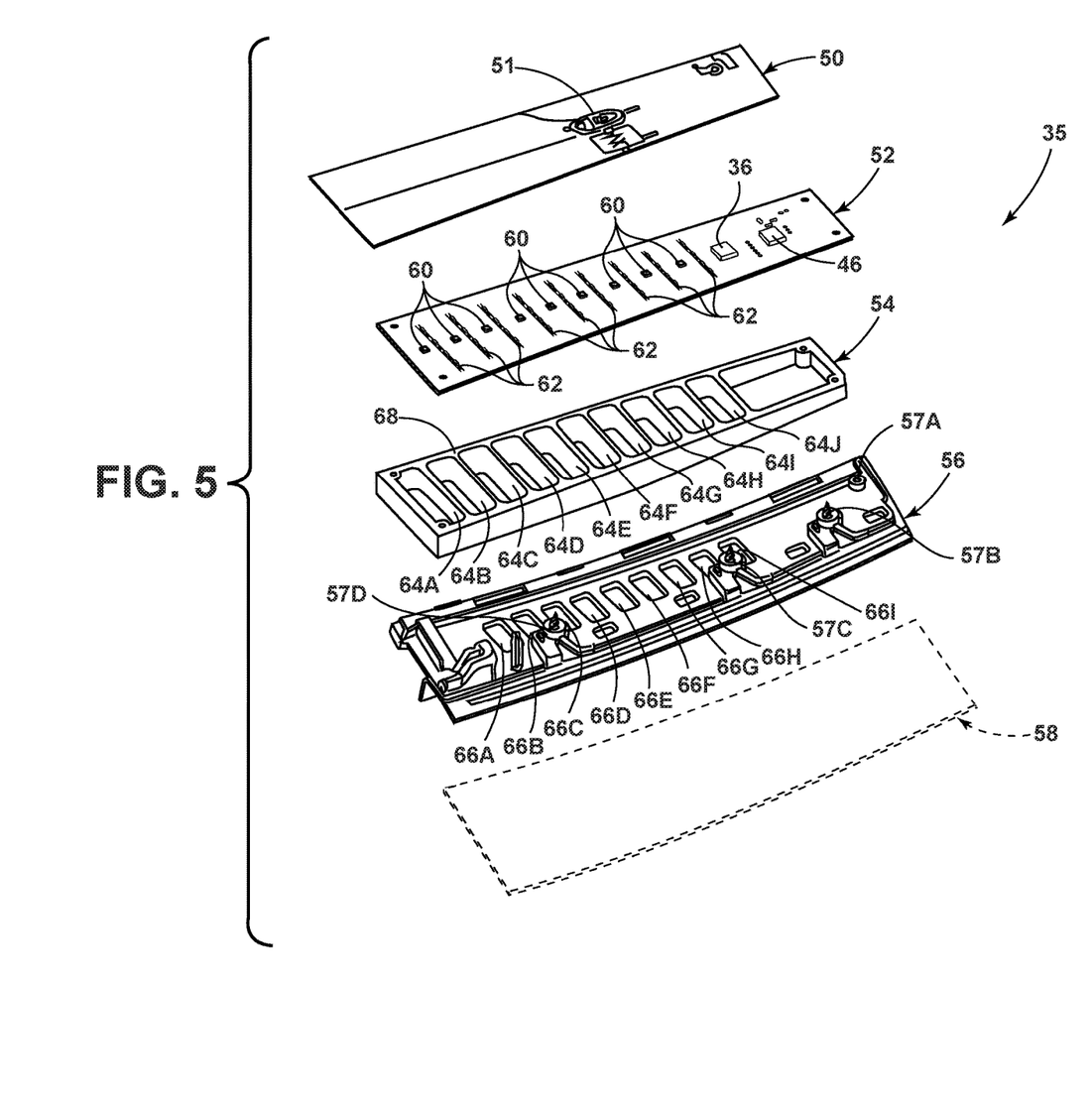
FIG. 5 is an exploded perspective view of a B-pillar warning light system.
Figure 6:
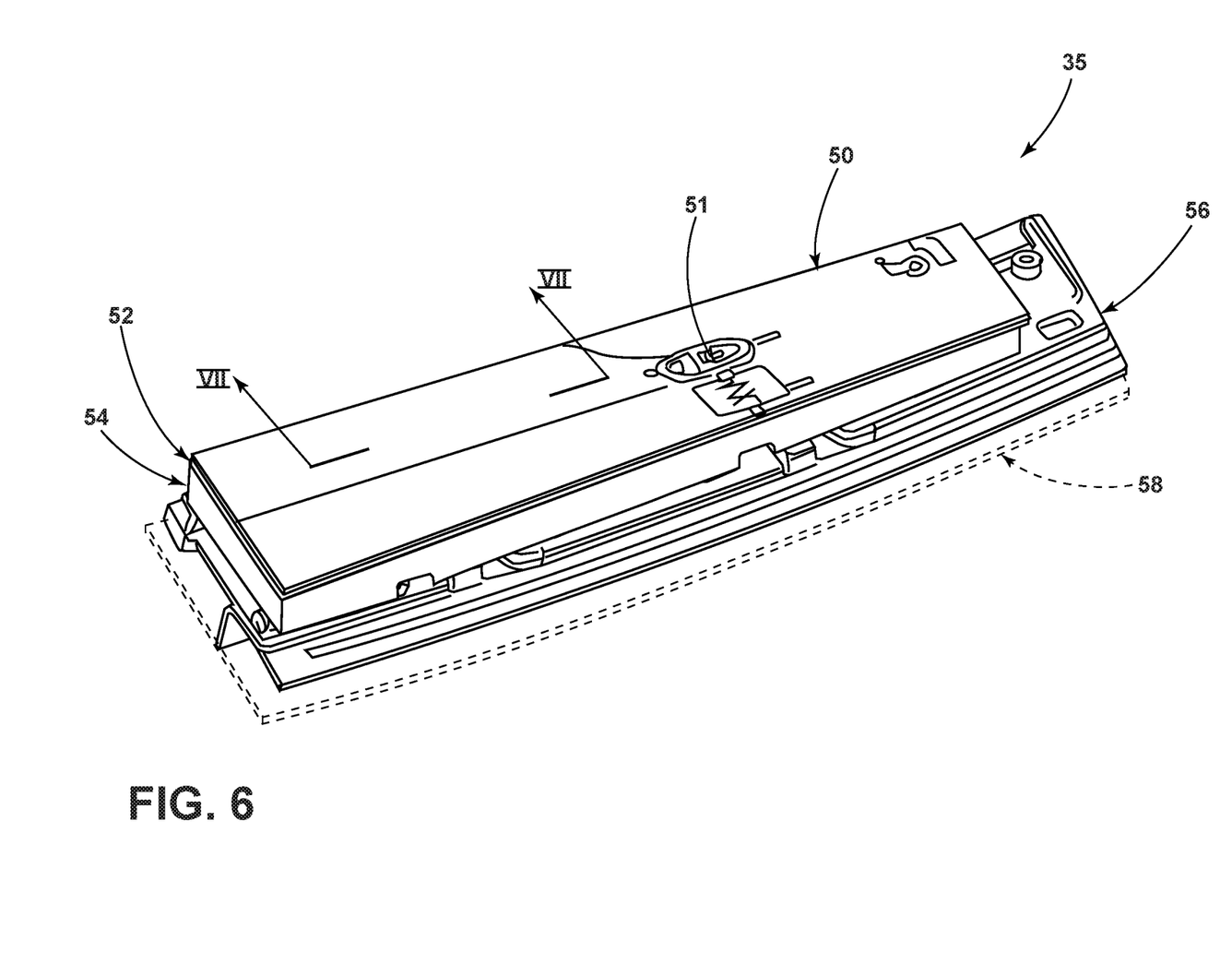
FIG. 6 is an isometric view of the B-pillar warning light of FIG. 5 in an assembled configuration.
Figure 7:
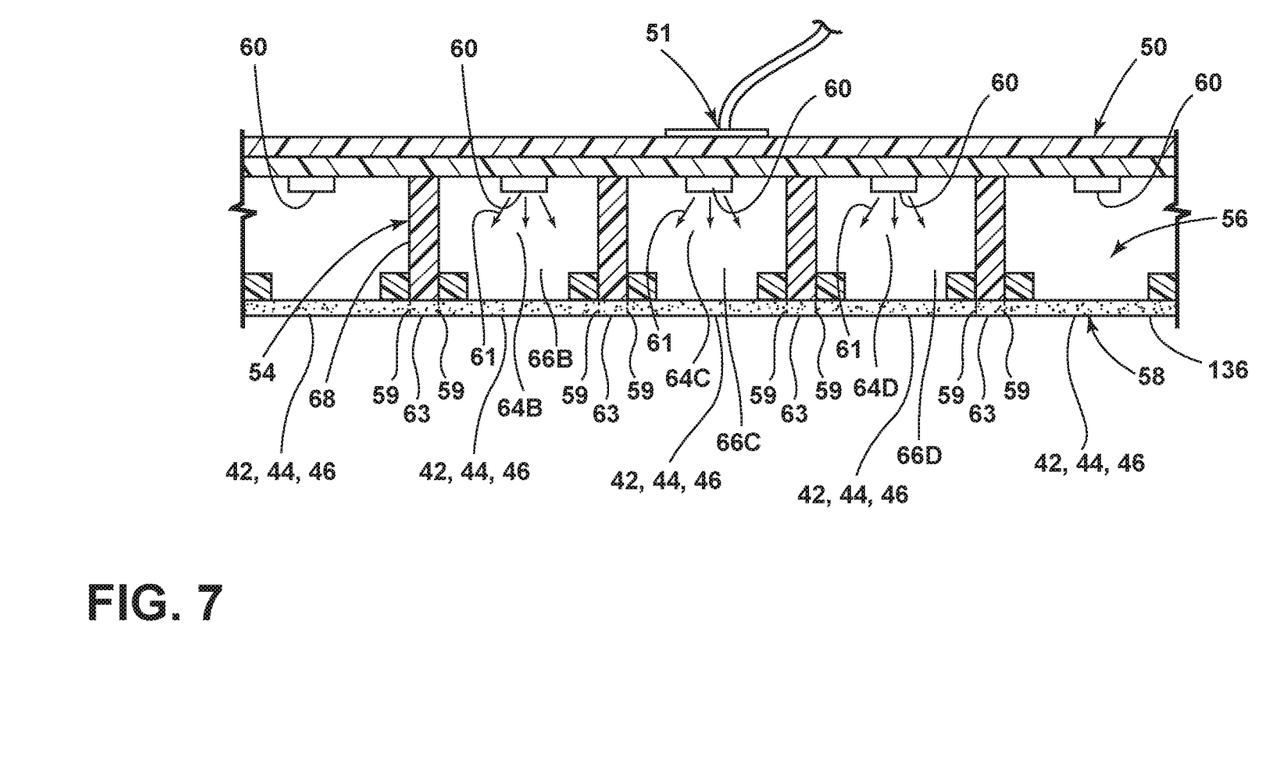
FIG. 7 is a fragmentary cross sectional view of a portion of the B-pillar warning light assembly of FIG. 6 taken along the line VII-VII.

5-7, the non-illuminated portions of outer surface 136 may be black, and the illuminated regions may have a very sharp, distinct boundary 59.

Referring again to FIG. 3, the B-pillar warning system 35 may include an audio device 36 that may comprise a speaker and/or a microphone that is operably connected to the control system 5. Warning system 35 may also utilize a horn (not shown) or other audio device of vehicle 1 in addition to or instead of, audio device/speaker 36. B-pillar warning system 35 may include a programmable controller 48 that is operably connected to the main vehicle control system 5. The controller 48 receives data from vehicle control system 5 concerning the location (e.g. distance "D") of a pedestrian 34 relative to vehicle 1, and the controller 48 generates signals 39 to control the lights and/or audio warning devices of system 35. In the illustrated example, electric circuit 38 receives signals 39 from controller 48 to thereby generate audio warnings utilizing speaker 36. The warning system 35 may be configured to provide a high frequency warning sound to alert an approaching pedestrian 34. This assists in warning a pedestrian 34 who may be distracted and/or visually impaired.

Referring to FIG. 4, B-pillar warning system 35 may optionally be configured to provide transition warning states 40C, 40E, and 40F in which combinations of green, yellow, and red lights 42, 44, and 46, respectively, are illuminated.

More specifically, if no pedestrian or other such object is detected within about six feet of vehicle 1, the B-pillar warning system 35 is initially in a rest or non-actuated state 40A in which no warning lights are illuminated, and in which speaker 36 does not produce a warning sound. However, as a pedestrian 34 approaches vehicle 1 and reaches an initial distance "D" (e.g. about 6.0 feet), controller 48 will cause warning system 35 to transition to warning state 40B in which three green areas 42A-42C are illuminated. As a pedestrian 34 continues to move towards vehicle 1, when the distance "D" is reduced (e.g. to about 5.0 feet) the B-pillar warning system 35 transitions to a warning state 40C in which one green area 42 is illuminated, and two yellow areas 44B and 44C are illuminated. In warning state 40C the intensity of the light produced by the regions 42A, 44B and 44C may be increased (e.g. 5%) to further alert a pedestrian 34. The combination of yellow and green illumination signifies a warning to an adjacent pedestrian or vehicle. As a pedestrian 34 or vehicle moves closer to a further reduced distance "D" (e.g. about 3.0 feet), the B-pillar warning system 35 transitions to warning state 40D in which three yellow regions 44A-44C are illuminated. In warning state 40D, the brightness or intensity of the regions 44A-44C may be further increased (e.g. 25%) to further alert/warn a pedestrian 34. If a pedestrian 34 continues to move closer to vehicle 1, B-pillar warning system 35 transitions to a warning state 40E in which two yellow regions 44A, 44B, and one red region 46C is illuminated. As a pedestrian 34 moves still closer to vehicle 1 to a distance D of, for example, about 1.5 feet, the B-pillar warning system 35 may transition to an alert state 40F in which two red lights 46B and 46C are illuminated, and two yellow lights 44A and 44B are also simultaneously illuminated. As a pedestrian moves still closer to a distance D of, for example, about 1.0 foot, the B-pillar warning system 35 may transition to an alert state 40G in which the green lights or regions 42 and yellow regions 44 are turned off, and only red lights or regions 46A-46C are illuminated. If a pedestrian continues to move closer to vehicle 1 to a distance D of, for example, about 0.75 feet, the B-pillar warning system may transition to a final "full stop" warning mode or state 40H in which red lights or regions 46A-46C flash, and in which the intensity or brightness of the red light of regions 46A-46C is further increased by, for example, 50%.

In addition to the lighted warnings, the B-pillar warning system 35 may also include audio warnings produced by speaker 36 or other vehicle audio devices (e.g. the horn). For example, in states 40A-40C, the warning system 35 (controller 48) may be configured to provide no audio warning from speaker 36. However, the warning system 35 may be configured to cause speaker 36 to emit a high pitch pulsating sound in warning states 40D-40F, and a continuous high pitch warning sound when in states 40G and 40H. The volume and/or frequency of the audio warning may be varied as a function of the detected distance D.

It will be understood that the B-pillar warning system 35 may transition between the warning states 40A-40H as a pedestrian 34 or the like approaches vehicle 1 and (in reverse order) as a pedestrian 34 moves away from vehicle 1. Furthermore, it will be understood that the distances D utilized to transition between warning states 40A-40H may be varied depending on the requirements of a particular application, and the present invention is not limited to the specific distances discussed above in connection with FIGS. 3 and 4. Furthermore, it will be understood that the B-pillar warning system 35 may be configured to provide only light warnings, only audio warnings, or a combination thereof.

With further reference to FIGS. 5 and 6, B-pillar warning system 35 may comprise a rear power panel/component 50, a printed circuit board (PCB) 52, a diffuser or spacer 54, an applique 56, and an optional outer sheet 58. Rear panel/component 50 includes a connector 51 that may be utilized to provide electrical power from vehicle power system 6 to the printed circuit board 52. The printed circuit board 52 includes a plurality of light sources 60 that are operably connected to processor/controller 48 via conductors and circuit components 62. Each light source 60 preferably comprises a RGB LED that can be selectively actuated to provide green, yellow, or red light. Speaker 36 and controller/processor 46 are also mounted on PCB 52. When assembled (FIG. 6), the printed circuit board 52 may be electrically connected to the vehicle electrical power supply 60 utilizing electrical connector 51. Applique 56 may be molded from a polymer material and may include mounting structures 57A-57D that are configured to secure warning system 35 to a vehicle door or body structure.

Diffuser/spacer 54 may be molded from a transparent or translucent material such as silicone having resilient properties. If diffuser 54 is molded from a resilient material, the resiliency absorbs energy due to impacts on outer surface 136. The diffuser/spacer 54 includes a plurality of openings or passageways 64A-64J therethrough. When assembled, passageway 64J is aligned with speaker 36, and passageways 64A-64J are aligned with light sources 60. During operation, light 61 from the light sources 60 passes through passageways 64A-64J of diffuser/spacer 54 and through openings 66A-66I of applique 56. Light 61 then passes through sheet 58 to form illuminated regions 42, 44, 46, etc. Sheet 58 may be relatively thin (e.g. 0.030-0.060 inches thick), and light 61 passing through sheet 58 forms very distinct boundaries or edges 59 extending around the illuminated areas 42, 44, 46. This, in turn, forms narrow dark (e.g. black) bands 63 that extend between adjacent illuminated regions 42, 44, 46. Sheet 58 may comprise light-transmitting polymer that is tined such that the outer surface 136 of sheet 58 is dark (e.g. black) in appearance except at illuminated regions 42, 44, 46 when light sources 60 are activated to produce light 61. Although the light sources 60 of PCB 52 are shown facing away from diffuser/spacer 54 in FIG. 5, it will be understood that, when assembled, the light sources 60 face the diffuser/spacer 54 as shown in FIG. 7, and light sources 60 are aligned with passageways 64A-64I. In the illustrated example, applique 56 does not include an opening corresponding to the speaker opening 64J in diffuser/spacer 54. However, an opening aligned with speaker 36 may be provided if required for a particular application.

As noted above, diffuser/spacer 54 may be made from a resilient, transparent material such as silicone. Inner surfaces 68 (FIG. 7) of passageways 64A-64I may be coated with paint or other opaque material to prevent light 61 from light sources 60 from entering the diffuser 54. Thus, the openings or passageways 64A-64I form light guides to prevent light from adjacent light sources 60 from escaping to adjacent regions. This provides distinct illuminated regions (e.g. rectangular bars/bands) as shown in FIGS. 3 and 4 when light sources 60 are activated. As noted above, warning system 35 may include a thin sheet 58 of light-transmitting material that is secured to applique 56 to close off openings 66A-66I. Applique 56 and sheet 58 may be curved (convex). Because PCB 52 is substantially flat, diffuser/spacer 54 may have a non-uniform thickness (e.g. increased center thickness) to fit between PCB 52 and applique 56. If outer sheet 58 is tinted (e.g. "smoke"), the components of PCB 52, diffuser 54, and applique 56 are not visible through sheet 58 to a user or other individual standing adjacent vehicle 1 when light sources 60 are turned off. Thus, sheet 58 may be configured to provide a smooth, convex or planar uniformly black outer surface 136 (FIG. 3) that does not interfere with the appearance/styling of the B-pillar of vehicle 1. The outer sheet 58 may be secured to applique 56 utilizing adhesive and/or mechanical fasteners or other suitable arrangement (not shown). Alternatively, applique 56 may be molded from a light-transmitting material (e.g. transparent acrylic that has been tinted "smoke" color), and a thin layer of the light-transmitting material of applique 56 may be provided instead of openings 66A-66I, such that a separate outer sheet 58 is not required (i.e. "openings" 66A-66I may comprise light-transmitting regions of applique 56).

Figure 8:
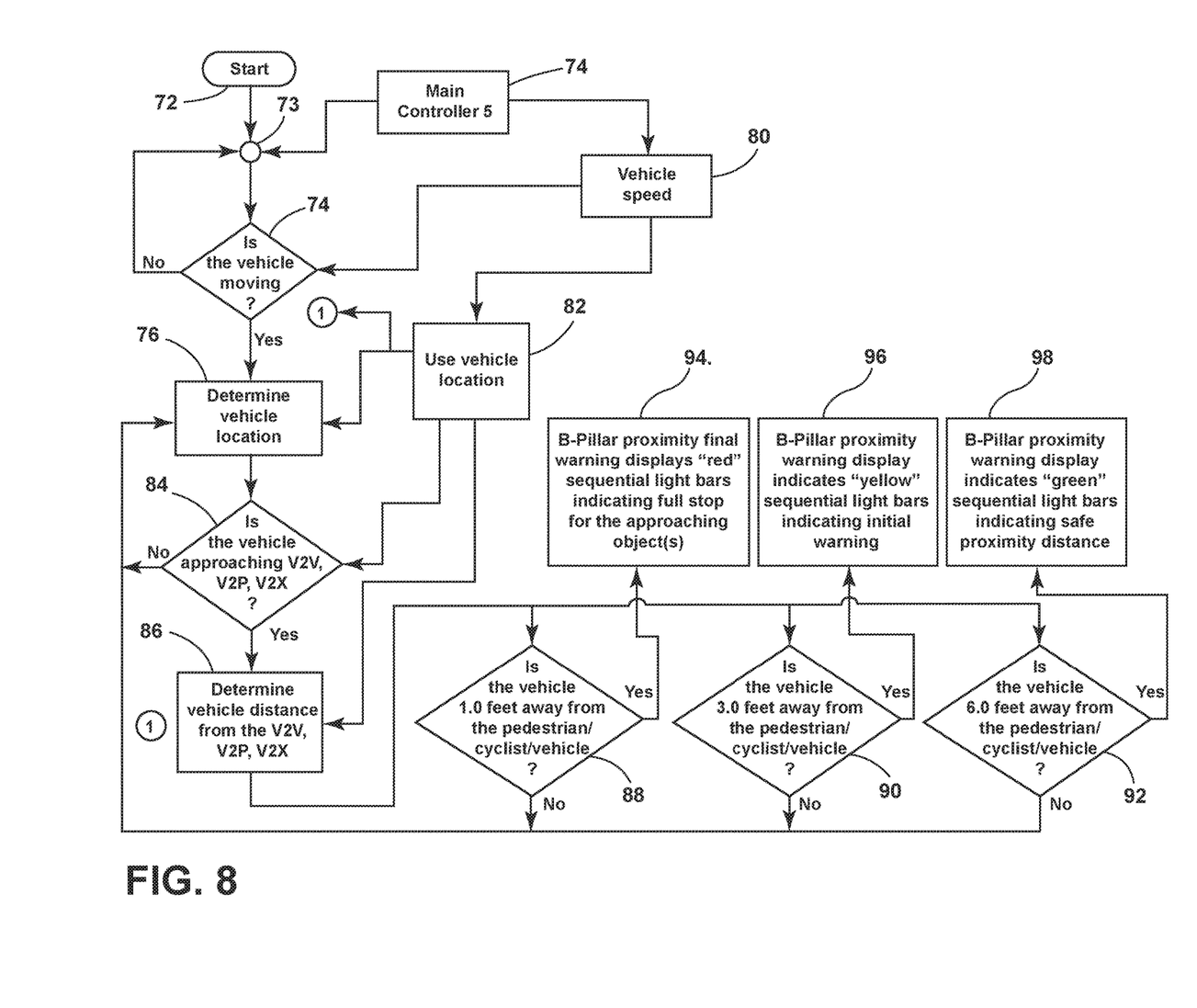
FIG. 8 is a flow chart showing operation of a B-pillar light warning system according to one aspect of the present invention.

FIG. 8 is a flow chart showing logic flow/operation of a warning system according to one aspect of the present invention. During operation of the warning system 35, inputs from main controller 5 are provided as shown at 74 to determine vehicle speed and location 80 and 82. As discussed below, vehicle location may be utilized at step 86 by warning system 35 to determine the warning state and corresponding light actuation. After the start 72, at step 74 the system determines if the vehicle 1 is moving. If the vehicle 1 is not moving, the system returns to junction 73. However, if the vehicle 1 is moving, the system determines a vehicle location as shown at step 76. Controller 5 may include a GPS device that may be utilized to determine the vehicle location at step 76. At step 84, the system determines if the vehicle 1 is approaching another vehicle ("V2V"), a pedestrian ("V2P"), or other "generic" object ("V2X"). If not, the system returns to step 76. However, if an object or pedestrian is approaching the vehicle 1, the system determines vehicle distance "D" from the object at step 86.

If the pedestrian/cyclist/vehicle is at about 1.0 feet, 3.0 feet, or 6.0 feet, the system proceeds as shown by the steps 88, 90, and 92 to provide the corresponding warnings 94, 96, and 98, respectively.

If a pedestrian is detected at a "safe" distance (e.g. about 6.0 feet) at step 92, the B-pillar warning display provides a green only display corresponding to the warning state 40B of FIGS. 3 and 4. As discussed above, when in this warning state, the system does not provide an audio warning system.

If the system determines that a pedestrian or vehicle is at an intermediate distance (e.g. about 3.0 feet) at step 90, the display illuminates yellow light bars (warning state 40D). In this warning state, the yellow light bars 44A-44C may be illuminated, and an initial audio warning comprising high pitch pulsating sounds may be produced by the speaker 36.

If a user or vehicle is at a distance of about 1.0 foot or less (step 88), the red illumination areas 46A-46C may be illuminated (i.e. warning state 40G), and a high pitch continuous audio warning may also be provided.

It will be understood that the system may include additional warning states (not shown in FIG. 8) in which more than one color of light is displayed as discussed above in connection with FIG. 4.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An autonomous vehicle comprising:
   a body structure and front and rear doors on opposite sides thereof and B-pillars between upper portions of the front and rear doors;
   a vehicle control system comprising an autonomous driving sensing system configured to detect pedestrians and the locations of pedestrians relative the body structure, and wherein the vehicle control system is configured to determine a distance from the opposite sides to pedestrians;
   a warning light system on the at least one of the B-pillars, wherein the warning light system including light sources that are configured to emit green light if a pedestrian is detected at a first distance or a distance greater than the first distance, yellow light if a pedestrian is detected at an intermediate distance that is between the first distance and a second distance that is less than the first distance, and red light if a pedestrian is detected at a distance equal to or less than the second distance; and
   the warning light system is configured to simultaneously illuminate at least one discrete green light source and at least one discrete yellow light source if a pedestrian moves towards the autonomous vehicle from a distance that is greater than the first distance to a distance that is less than the first distance.

2. An autonomous vehicle comprising:
   a body structure and front and rear doors on opposite sides thereof and B-pillars between upper portions of the front and rear doors;
   a vehicle control system comprising an autonomous driving sensing system configured to detect pedestrians and the locations of pedestrians relative the body structure, and wherein the vehicle control system is configured to determine a distance from the opposite sides to pedestrians;
   a warning light system on the at least one of the B-pillars, wherein the warning light system including light sources that are configured to emit green light if a pedestrian is detected at a first distance or a distance greater than the first distance, yellow light if a pedestrian is detected at an intermediate distance that is between the first distance and a second distance that is less than the first distance, and red light if a pedestrian is detected at a distance equal to or less than the second distance;

wherein the warning light system does not emit green light, yellow light, or red light if a pedestrian is detected at a third distance that is greater than the first distance;

wherein the first distance is 5 feet, the second distance is 0.75 feet, and the third distance is 6 feet;

wherein the warning light system includes a first region that emits green light, a second region adjacent the first region that emits yellow light, and a third region adjacent the second region that emits red light;

wherein the first, second, and third regions are arranged in a vertical row;

wherein the first region includes three discrete light sources that emit green light;

wherein the second region includes three discrete light sources that emit yellow light;

wherein the third region includes three discrete light sources that emit red light; and the warning light system is configured to simultaneously illuminate at least one discrete yellow light source and at least one discrete red light source if a pedestrian moves towards the autonomous vehicle from a distance that is greater than the second distance to a distance that is less than the second distance.

3. An autonomous vehicle comprising:

a body structure and front and rear doors on opposite sides thereof and B-pillars between upper portions of the front and rear doors;

a vehicle control system comprising an autonomous driving sensing system configured to detect pedestrians and the locations of pedestrians relative the body structure, and wherein the vehicle control system is configured to determine a distance from the opposite sides to pedestrians;

a warning light system on the at least one of the B-pillars, wherein the warning light system including light sources that are configured to emit green light if a pedestrian is detected at a first distance or a distance greater than the first distance, yellow light if a pedestrian is detected at an intermediate distance that is between the first distance and a second distance that is less than the first distance, and red light if a pedestrian is detected at a distance equal to or less than the second distance;

wherein the warning light system does not emit green light, yellow light, or red light if a pedestrian is detected at a third distance that is greater than the first distance;

wherein the first distance is 5 feet, the second distance is 0.75 feet, and the third distance is 6 feet;

wherein the warning light system includes a first region that emits green light, a second region adjacent the first region that emits yellow light, and a third region adjacent the second region that emits red light;

wherein the first, second, and third regions are arranged in a vertical row;

wherein the first region includes three discrete light sources that emit green light;

wherein the second region includes three discrete light sources that emit yellow light;

wherein the third region includes three discrete light sources that emit red light; and the discrete light sources comprise horizontally elongated bands that are arranged in a vertical row, wherein each band can be selectively illuminated.

4. The autonomous vehicle of claim 3, wherein:

the warning light system comprises:

a printed circuit board including a vertical row of RGB LEDs;

a diffuser comprising a light-transmitting material that diffuses light from the RGB LEDs to form a vertical row of bands, each having a quadrilateral perimeter; and a polymer outer applique having a smooth outer surface and an opposite inner surface;

and wherein the diffuser is sandwiched between the printed circuit board and the applique.

5. The autonomous vehicle of claim 4, wherein:

the applique includes a layer of tinted polymer material covering the diffuser whereby the bars are not visible through the smooth outer surface of the applique unless the RGB LEDs are actuated.

6. The autonomous vehicle of claim 5, wherein:

the applique has a generally rectangular perimeter shape that is elongated vertically.

7. The autonomous vehicle of claim 6, wherein:

the outer surface of the applique is substantially planar.

* * * * *